(12) United States Patent
Webb

(10) Patent No.: US 6,890,760 B1
(45) Date of Patent: May 10, 2005

(54) ARRAY FABRICATION

(75) Inventor: Peter G. Webb, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 424 days.

(21) Appl. No.: 09/628,470

(22) Filed: Jul. 31, 2000

(51) Int. Cl.$^7$ .................................................. G01N 1/10
(52) U.S. Cl. .................... 436/180; 422/99; 422/100; 422/63; 422/64; 422/65; 422/66; 422/67; 347/40; 347/19; 347/14; 347/9; 347/12
(58) Field of Search ............................. 347/43, 40, 78, 347/19, 23, 14, 9, 12; 422/63–67, 94–104; 700/241, 266, 267, 283; 436/180

(56) References Cited

U.S. PATENT DOCUMENTS

| | | | |
|---|---|---|---|
| 4,046,513 A | * 9/1977 | Johnson ........................ | 422/55 |
| 4,436,822 A | * 3/1984 | Eseifan ........................ | 422/100 |
| 4,907,013 A | * 3/1990 | Hubbard et al. .............. | 347/19 |
| 4,963,882 A | * 10/1990 | Hickman ...................... | 347/41 |
| 5,057,852 A | * 10/1991 | Formica et al. ............... | 347/40 |
| 5,192,959 A | * 3/1993 | Drake et al. .................. | 347/42 |
| 5,198,054 A | * 3/1993 | Drake et al. .................. | 156/299 |
| 5,449,754 A | 9/1995 | Nishioka ...................... | 530/334 |
| 5,581,284 A | * 12/1996 | Hermanson ................... | 347/40 |
| 5,733,509 A | 3/1998 | Ackley et al. | |
| 5,751,311 A | * 5/1998 | Drake .......................... | 347/43 |
| 5,796,418 A | * 8/1998 | Silverbrook ................. | 347/55 |
| 5,807,522 A | * 9/1998 | Brown et al. ................. | 422/50 |
| 5,808,639 A | * 9/1998 | Silverbrook ................. | 347/57 |
| 5,847,105 A | 12/1998 | Baldeschwieler et al. | |
| 5,864,351 A | * 1/1999 | Silverbrook ................. | 347/11 |
| 5,920,331 A | * 7/1999 | Silverbrook ................. | 347/14 |
| 5,946,011 A | * 8/1999 | Kanaya ........................ | 347/14 |
| 5,958,342 A | * 9/1999 | Gamble et al. ................ | 347/1 |
| 5,984,455 A | * 11/1999 | Anderson .................... | 347/44 |
| 6,001,309 A | * 12/1999 | Gamble et al. .............. | 347/19 |
| 6,010,205 A | * 1/2000 | Billet ........................... | 347/19 |
| 6,024,925 A | 2/2000 | Little et al. .................. | 422/100 |
| 6,057,100 A | * 5/2000 | Heyneker ..................... | 435/6 |
| 6,089,693 A | * 7/2000 | Drake et al. ................. | 347/19 |
| 6,103,518 A | * 8/2000 | Leighton ..................... | 422/63 |
| 6,120,125 A | * 9/2000 | Kim ............................ | 347/19 |
| 6,203,140 B1 | * 3/2001 | Oyen .......................... | 347/41 |
| 6,228,659 B1 | * 5/2001 | Kowallis et al. ............. | 422/100 |
| 6,238,112 B1 | * 5/2001 | Girones et al. .............. | 347/19 |
| 6,251,601 B1 | * 6/2001 | Bao et al. .................... | 435/6 |

(Continued)

FOREIGN PATENT DOCUMENTS

| | | | |
|---|---|---|---|
| GB | 2355716 | 5/2001 | |
| GB | 2 388 601 | 11/2003 | |
| WO | WO 95/25116 | 9/1995 | .......... C04H/21/00 |
| WO | WO 98/41531 | 9/1998 | |
| WO | WO 00/60425 | 10/2000 | |

Primary Examiner—Jill Warden
Assistant Examiner—Elizabeth Quan
(74) Attorney, Agent, or Firm—Gordon M. Stewart

(57) ABSTRACT

Methods, apparatus, and computer program, for use in fabricating a chemical array. The method may use an apparatus which includes a head system, a transport system, and a processor. The head system has multiple groups of drop dispensers which move in unison, each group having multiple dispensers. The transport system can move the head system with respect to a substrate with different dispensers of the groups following respective paths. The processor can dispense droplets from dispensers during operation of the transport system, in a pattern along a selected path for each group so as to form the array. The method includes identifying an error in one or more dispensers. When a dispenser of a first group is in error, then a second dispenser of each group is moved along the selected path for its group while dispensing droplets from at least the second dispenser of the first group in at least part of the pattern for the selected path of the first group.

32 Claims, 5 Drawing Sheets

U.S. PATENT DOCUMENTS

| | | | |
|---|---|---|---|
| 6,283,572 B1 * | 9/2001 | Kumar et al. ................. 347/19 |
| 6,284,113 B1 * | 9/2001 | Bjornson et al. ........... 204/453 |
| 6,302,517 B1 * | 10/2001 | Kanaya ....................... 347/16 |
| 6,332,662 B1 * | 12/2001 | Choi ........................... 347/19 |
| 6,347,855 B1 * | 2/2002 | Takanaka .................... 347/19 |
| 6,347,857 B1 * | 2/2002 | Purcell et al. ................ 347/19 |
| 6,354,689 B1 * | 3/2002 | Couwenhoven et al. ...... 347/19 |
| 6,364,451 B1 * | 4/2002 | Silverbrook ............... 347/103 |
| 6,371,590 B1 * | 4/2002 | Hah ............................ 347/19 |
| 6,420,180 B1 * | 7/2002 | Bass .......................... 422/100 |
| 6,446,642 B1 | 9/2002 | Caren et al. |
| 6,458,583 B1 | 10/2002 | Bruhn et al. |
| 6,656,740 B1 | 12/2003 | Caren et al. |
| 6,689,323 B2 | 2/2004 | Fisher et al. |
| 2001/0051334 A1 | 12/2001 | Barth et al. |
| 2003/0143756 A1 | 7/2003 | Fisher et al. |

* cited by examiner

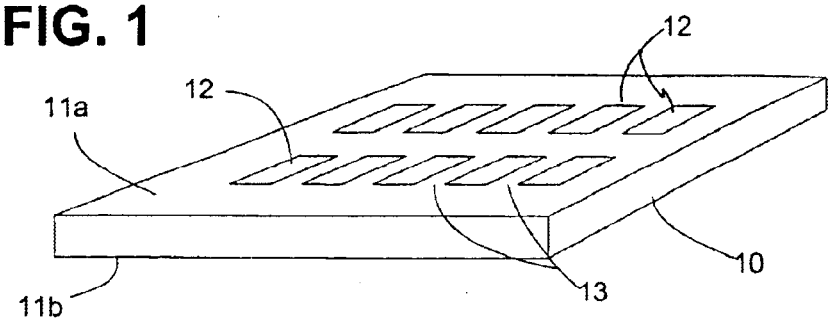
FIG. 1
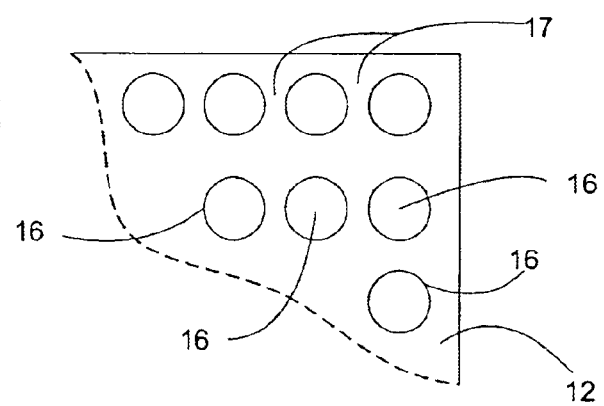
FIG. 2
FIG. 3
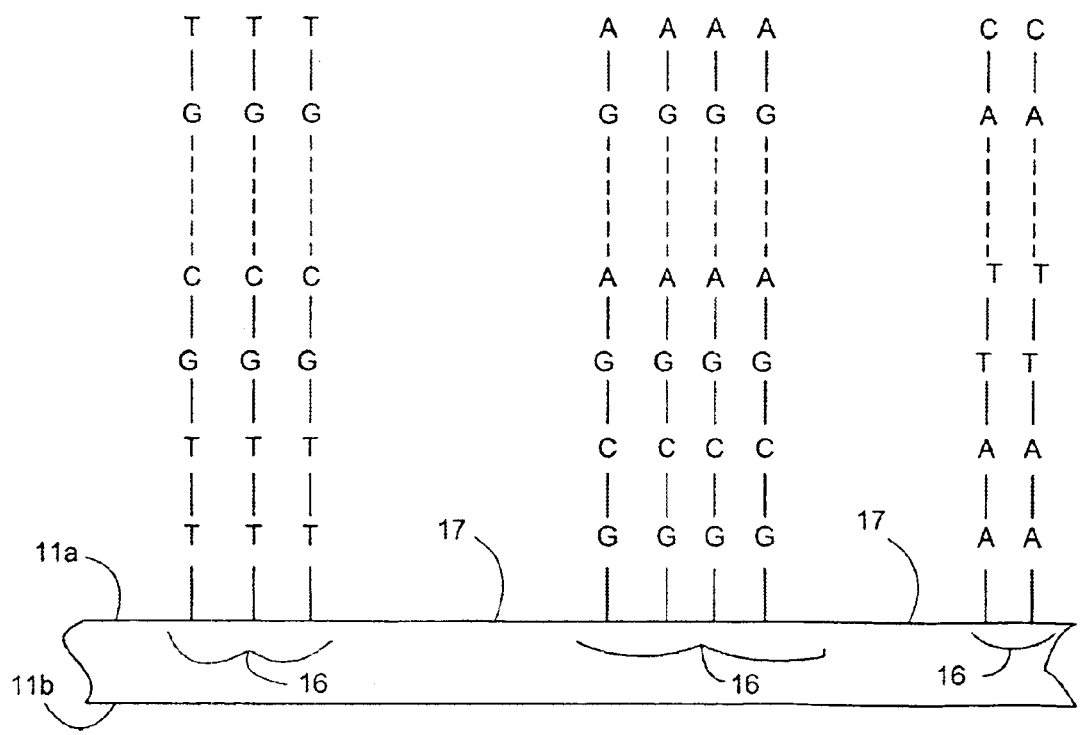

ARRAY FABRICATION

FIELD OF THE INVENTION

This invention relates to arrays, particularly polynucleotide arrays such as DNA arrays, which are useful in diagnostic, screening, gene expression analysis, and other applications.

BACKGROUND OF THE INVENTION

Polynucleotide arrays (such as DNA or RNA arrays), are known and are used, for example, as diagnostic or screening tools. Such arrays include regions of usually different sequence polynucleotides arranged in a predetermined configuration on a substrate. These regions (sometimes referenced as "features") are positioned at respective locations ("addresses") on the substrate. The arrays, when exposed to a sample, will exhibit an observed binding pattern. This binding pattern can be detected upon interrogating the array. For example all polynucleotide targets (for example, DNA) in the sample can be labeled with a suitable label (such as a fluorescent compound), and the fluorescence pattern on the array accurately observed following exposure to the sample. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated by depositing previously obtained biopolymers (such as from synthesis or natural sources) onto a substrate, or by in situ synthesis methods. Methods of depositing obtained biopolymers include dispensing droplets to a substrate from dispensers such as pin or capillaries (such as described in U.S. Pat. No. 5,807,522) or such as pulse jets (such as a piezoelectric inkjet head, as described in PCT publications WO 95/25116 and WO 98/41531, and elsewhere). For in situ fabrication methods, multiple different reagent droplets are deposited from drop dispensers at a given target location in order to form the final feature (hence a probe of the feature is synthesized on the array stubstrate). The in situ fabrication methods include those described in U.S. Pat. No. 5,449,754 for synthesizing peptide arrays, and described in WO 98/41531 and the references cited therein for polynucleotides. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura et al., *Ann. Rev. Biochem.* 53: 323–356; Hunkapillar et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, U.S. Pat. No. 5,153,319, U.S. Pat. No. 5,869,643, EP 0294196, and elsewhere.

In array fabrication, the quantities of polynucleotide available, whether by deposition of previously obtained polynucleotides or by in situ synthesis, are usually very small and expensive. Additionally, sample quantities available for testing are usually also very small and it is therefore desirable to simultaneously test the same sample against a large number of different probes on an array. These conditions require use of arrays with large numbers of very small, closely spaced features. It is important in such arrays that features actually be present, that they are put down accurately in the desired target pattern, are of the correct size, and that the DNA is uniformly coated within the feature. Failure to meet such quality requirements can have serious consequences to diagnostic, screening, gene expression analysis or other purposes for which the array is being used. However, for mass production of arrays with many features, a dispensing system is required which typically has many drop dispensers.

The present invention realizes that one or more of such drop dispensers may suffer from errors, such as failure to dispense a drop at all or failure to dispense in the correct location. To reduce errors in arrays formed with such an apparatus non-error dispensers can be used to dispense droplets which would otherwise have been dispensed by an error dispenser. However, this can involve multiple additional movements of the dispensers relative to the substrate which requires further time (and hence can decrease array quantity produced over a given time) and can lead to further errors.

It would be desirable then, to provide a means by which drops to be dispensed by dispensers in error, can instead be dispensed by non-error dispensers while maintaining a relatively simple pattern of movement of the drop dispensers relative to a substrate.

SUMMARY OF THE INVENTION

The present invention provides a method for fabricating a chemical array using an apparatus having a head system with multiple groups of drop dispensers which move in unison. The groups may, for example, include respective columns and rows of dispensers. The apparatus also has a transport system to move the deposition system with respect to a substrate with different dispensers of the groups following respective paths. A processor controls the dispensers so as to cause them to dispense droplets during operation of the transport system, in a pattern along a selected path for each group so as to form the array. The method may include identifying an error in one or more dispensers. Such identification may, for example, be based on data specifically identifying an error dispenser (such as operator input data) or upon data received from a sensor which monitors dispensers for an error and provides corresponding data to the processor (in which case the processor can identify an error from the received data). When a first dispenser of a first group is in error, then a second dispenser of each group is moved along the selected path for its group while dispensing droplets from at least the second dispenser of the first group in at least part of the pattern for the selected path of the first group. This step may involve re-positioning the head system from a position in the which the first dispensers will follow the selected path for each group upon operation of the transport system, to a position in which second dispenser (and optionally further dispensers) follow the selected path for each group.

Droplets may be dispensed from each second dispenser of multiple groups in at least part of the pattern for the selected path of the same group. Alternatively, droplets may be dispensed from at least one second dispenser of a group (such as the first group, or for each of the groups) in the complete pattern for the selected path of the same group. In a preferred arrangement, a series of dispensers within each of different groups, may be loaded with a same fluid for dispensing. For example, members of a given series may communicate with a corresponding common reservoir for that series. In this case, droplets may be dispensed from a non-error dispenser of the same series as the error dispenser. For example, in the case where the dispensers of the group are arranged in rows and columns, there may be multiple series in each group with each series comprising a column of dispensers within the corresponding group.

In a particularly preferred operation of a method of the present invention, when a second dispenser of a second group is additionally in error, the first and second dispensers of each group are alternately moved along the selected path for that group while droplets are dispensed from non-error dispensers of the first and second groups in at least part of the pattern for the selected path for the respective groups. This same procedure can be extended to the general case where multiple identified dispensers of different order (including first or second) in respective groups are in error. That is, the corresponding non-error dispensers of each group are alternately moved along the selected path for that group while droplets are dispensed from the non-error dispensers each at least in part of the pattern for the selected path for the corresponding group. In any event, typically the pattern for the selected path of each group would be completed.

The present invention further provides an apparatus for fabricating a chemical array. The apparatus includes a deposition system and transport system, of any of the constructions as described above. The apparatus may further include a processor which coordinates dispensing of droplets and movement of the deposition system, in accordance with one or more methods of the present invention.

The present invention further provides a computer program product for use with an apparatus as described above, and which provides the instructions to the processor such that it can cause the deposition system and transport system to execute one or more methods of the present invention. The program product includes a computer readable storage medium having a computer program stored thereon which, when loaded into a computer (which is a "processor"), causes it to perform the steps required of it in such that the apparatus can perform a method of the present invention. Optionally, the present invention may further provide for exposing the array to a sample, and interrogating the array following the exposure and optionally processing results of the interrogation. Such an interrogation or processing result may be forwarded to a remote location.

The various aspects of the present invention can provide any one or more of the following and/or other useful benefits. For example, drops can be dispensed by non-error dispensers while maintaining a relatively simple pattern of movement of the drop dispenser system relative to a substrate. Further, re-loading of the head system with fluids to be dispensed, is not required by methods of the present invention in order to have a non-error dispenser dispense drops in place of an error dispenser.

BRIEF DESCRIPTION OF THE DRAWINGS

Embodiments of the invention will now be described with reference to the drawings, in which:

FIG. 1 illustrates a substrate carrying multiple arrays, such as may be fabricated by methods of the present invention;

FIG. 2 is an enlarged view of a portion of FIG. 1 showing ideal spots or features;

FIG. 3 is an enlarged illustration of a portion of the substrate in FIG. 2;

To facilitate understanding, identical reference numerals have been used, where practical, to designate identical elements that are common to the figures.

DETAILED DESCRIPTION OF EMBODIMENTS OF THE INVENTION

Figure 4A:
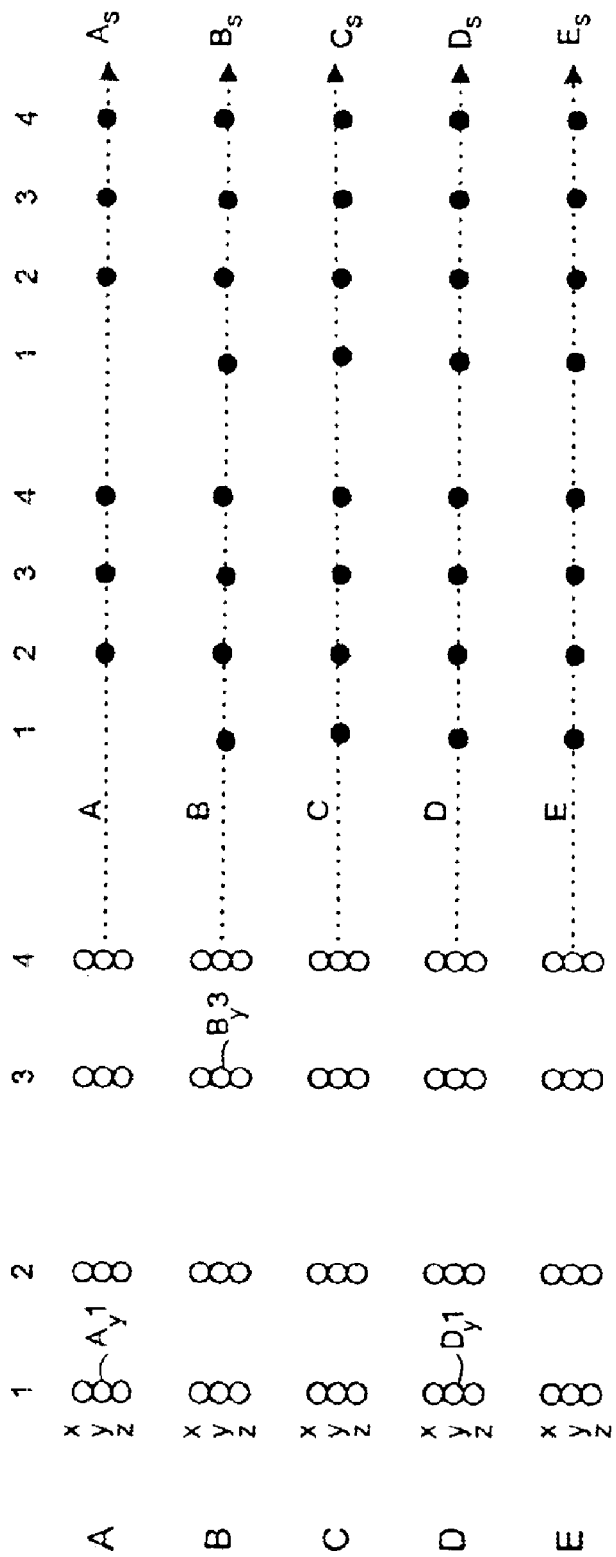
FIG. 4 schematically illustrates one embodiment of a method of the present invention.

In the present application, unless a contrary intention appears, the following terms refer to the indicated characteristics. A "biopolymer" is a polymer of one or more types of repeating units. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A "peptide" is used to refer to an amino acid multimer of any length (for example, more than 10, 10 to 100, or more amino acid units). A biomonomer fluid or biopolymer fluid reference a liquid containing either a biomonomer or biopolymer, respectively (typically in solution).

A "set" or "sub-set" of any item (such as a set of nozzles) may contain only one of the item, or only two, or three, or any number of multiple items. An "array", unless a contrary intention appears, includes any one, two or three dimensional arrangement of addressable regions bearing a particular chemical moiety to moieties (for example, biopolymers such as polynucleotide sequences) associated with that region. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). An "array layout" refers collectively to one or more characteristics of the features, such as feature positioning, one or more feature dimensions, and some indication of a moiety at a given location. "Hybridizing" and "binding", with respect to polynucleotides, are used interchangeably.

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

It will also be appreciated that throughout the present application, that words such as "top", "upper", and "lower" are used in a relative sense only. "Fluid" is used herein to reference a liquid. Reference to a singular item, includes the possibility that there are plural of the same items present. Furthermore, when one thing is "moved", "moving", "repositioned", "scanned", or the like, with respect to another, this implies relative motion only such that either thing or both might actually be moved in relation to the other. For example, when dispensers are "moved" relative to a substrate, either one of the dispensers or substrate may actually be put into motion by the transport system while the other is held still, or both may be put into motion. All patents and other cited references are incorporated into this application by reference.

Referring first to FIGS. 1–3, typically methods and apparatus of the present invention generate or use a contiguous planar substrate 10 carrying one or more arrays 12 disposed across a front surface 11a of substrate 10 and separated by inter-array areas 13. A back side 11b of substrate 10 does not carry any arrays 12. The arrays on substrate 10 can be designed for testing against any type of sample, whether a trial sample, reference sample, a combination of them, or a known mixture of polynucleotides (in which latter case the arrays may be composed of features carrying unknown sequences to be evaluated). While ten arrays 12 are shown in FIG. 5 and the different embodiments described below may use substrates with particular numbers of arrays, it will be understood that substrate 10 and the embodiments to be used with it, may use any number of desired arrays 12. Similarly, substrate 10 may be of any shape, and any apparatus used with it adapted accordingly. Depending upon intended use, any or all of arrays 12 may be the same or different from one another and each will contain multiple spots or features 16 of biopolymers in the form of polynucleotides. A typical array may contain from more than ten, more than one hundred, more than one thousand or ten thousand features, or even more than from one hundred thousand features. All of the features 16 may be different, or some or all could be the same. In the case where arrays 12 are formed by the conventional in situ or deposition of previously obtained moieties, as described above, by depositing for each feature a droplet of reagent in each cycle such as by using a pulse jet such as an inkjet type head, interfeature areas 17 will typically be present which do not carry any polynucleotide. It will be appreciated though, that the interfeature areas 17 could be of various sizes and configurations. It will also be appreciated that there need not be any space separating arrays 12 from one another. Each feature carries a predetermined polynucleotide (which includes the possibility of mixtures of polynucleotides). As per usual, A, C, G, T represent the usual nucleotides. It will be understood that there may be a linker molecule (not shown) of any known types between the front surface 11a and the first nucleotide.

For the purposes of the discussions below, it will be assumed (unless the contrary is indicated) that the array being formed in any case is a polynucleotide array formed by the deposition of previously obtained polynucleotides using pulse jet deposition units. However, the applicability of the method to arrays of other polymers or chemical moieties generally, whether formed by multiple cycle in situ methods or deposition of previously obtained moieties, or using other types of dispensers, will be understood from these discussions.

Referring to FIG. 4, operation of a method of the present invention is illustrated. FIG. 4 is a view from above looking down (using the orientation of FIG. 6) toward a head system 210 and substrate 10 (not shown in FIG. 4 for clarity) onto which an array is to be fabricated. Head system 210 has two heads 210a and 210b. In FIG. 4 each head 210a and 210b is illustrated with fifteen parallel rows and two columns (all parallel) of dispensers. However, as described below in connection with FIG. 6, each head may in practice have many more rows and columns although the number of rows and columns have been kept low in FIGS. 4 and 5 for the purposes of clarity. Each dispenser is illustrated by its drop dispensing outlet (the drop outlet orifice, for example, in a corresponding pulse jet) represented by a hollow circle in FIG. 4. Deposited droplets are represented by solid black circles. Since, as described below in connection with FIG. 6, heads 210a and 210b are both mounted to the same head retainer 208, all drop dispensers will be moved in unison by the transport system (see FIG. 6). These drop dispensers are identified as groups A, B, C, D, and E in FIG. 4, each group having respective three rows of dispensers x, y, and z, in four columns 1, 2, 3, and 4. It will be understood though, that it is possible that each group may have only one column of dispensers (that is, each group may have only three dispensers). The center to center spacing of rows of dispensers within a group, is equal for all groups. In the discussion of FIGS. 4 and 5, any particular drop dispenser will be referenced by its group number, followed by row and column number. For example, drop dispenser $A_y1$ refers to the dispenser in group A, row y, column 1, and drop dispenser $B_y2$ refers to the drop dispenser in group B, row y, column 2. Each group A, B, C, D, E has four series of dispensers, each series being the three dispensers in a column. Dispensers of each series communicate with a common reservoir for that series and thus in operation dispensers of a same series are loaded with the same fluid, as described below.

In the following discussion row y in each group will be regarded as a first row, with row x being a second row in each group (and row z being a third row). However, designation of rows as "first", "second", "third", and the like is merely an arbitrary naming for identification purposes only and does not imply that the rows are in the physical sequence of first, second and third one after the other. Nor does such naming imply that during operation of the method the "first" row should dispense drops first, followed by the "second-"row. Instead, the order of dispensing from the rows may be in any convenient order with, for example, the "second" row dispensing drops before the "first" row. However the identification of rows implies that when a given named row (or dispenser within a row) of one group is aligned for movement along a selected path $A_S$ through $E_S$ for that group, the same named row (or dispenser) of the other groups are simultaneously aligned for movement along the respective selected paths for their groups. For example, when the second row of group A is moved along the selected path $A_s$ for group A, the second row of groups B, C, D, and E will be simultaneously moved along the selected paths of their respective groups. Such similarly named rows (or dispensers) are therefore corresponding rows (or dispensers) of different groups. Dispensing of all droplets in the required pattern along all selected paths will result in at least a portion of the target array. Similarly, reference to a group as the "first", "second", or the like, is an arbitrary designation only, and does not imply that the groups are in any sequence spatially with respect to one another.

In FIG. 4 when the transport system moves head system 210 in a straight line in the direction of any of parallel paths $A_s$ through $E_s$, the different rows of dispensers will follow respective parallel paths across the substrate which extend in the direction. However, during operation of the transport system processor 140 (FIG. 6) only dispenses droplets from dispensers (by controlling dispenser operation) in a pattern along the selected path $A_s$ through $E_s$ for each group. The selected path is the paths which will form the array when drops are dispensed therealong in the required pattern. In FIG. 4A head system 210 has initially been positioned so that the first rows $A_y$, $B_y$, $C_y$, $D_y$, $E_y$, are aligned with will respective selected paths $A_s$, through $E_s$ (that is, they will be moved along paths $A_s$ through $E_s$ upon activation of the transport system). However, processor 140 has identified an error in a first row y of the first group A while no errors have been identified in any of the dispensers of the secondrows. Specifically dispenser $A_y1$ does not dispense a droplet when required to do so. With the position of head system 210 shown in FIG. 4A, if two repetitions of dispensing from head system 210 were to be performed during operation of the transport system, the result would be an array shown in FIG. 4A with two sets of deposited drops (each having columns 14) and in which no drops were deposited at the two positions A1.

Figure 4B:
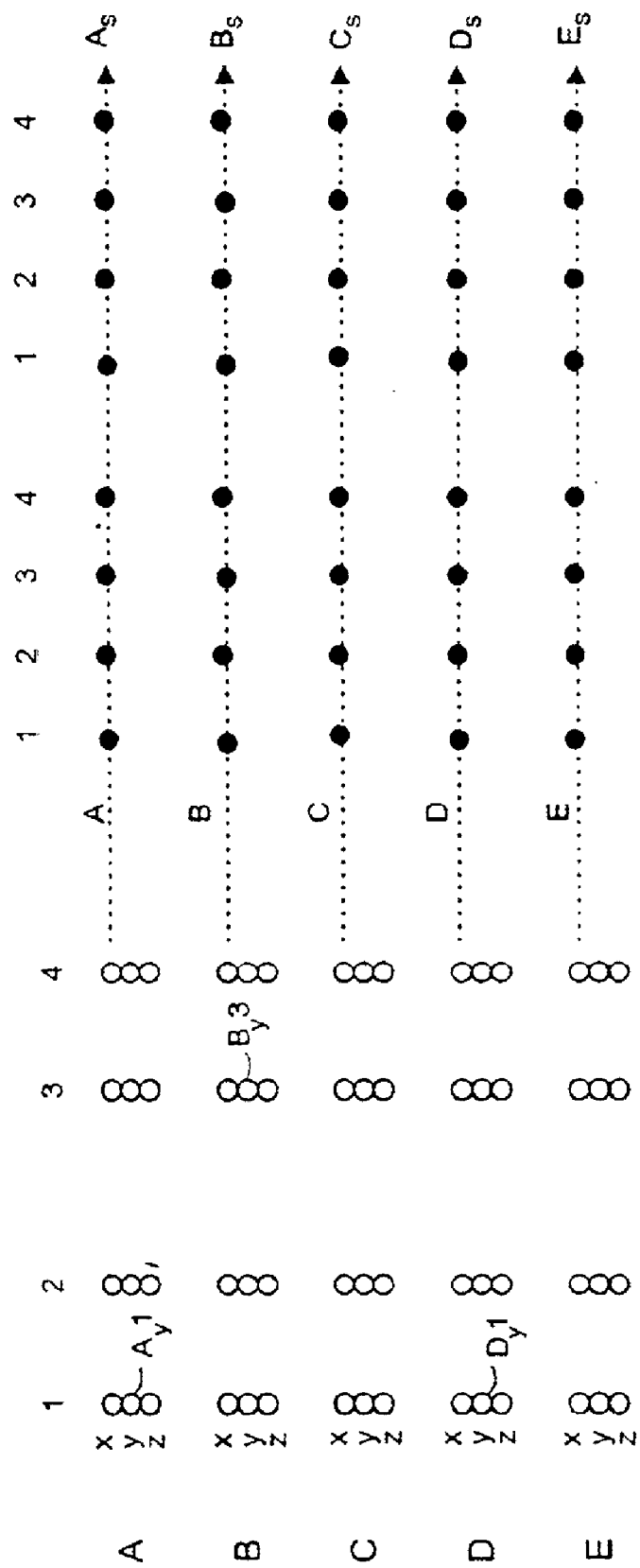

To avoid the foregoing problem, prior to dispensing drops, processor 140 positions head system 210 as shown in FIG. 4B, with t the second rows y aligned with respective selected paths $A_s$ through $E_s$. Processor 140 then activates the transport system such that the second row x of each group is moved along the selected path for its group, while dispensing droplets from each second row x of the groups A, B, C, D, and E in all of the pattern for the selected path of the first group. As in FIG. 4A two repetitions of dispensing from head system 210 may be performed to obtain the complete array as illustrate in FIG. 4B. In FIG. 4B then, droplets are dispensed from each of the second rows x of each of the groups, in the complete pattern for the selected path of the corresponding group. By processor 140 moving the second rows x along the selected paths $A_s$ through $E_s$, after identifying the error in dispenser $A_y1$, rather than using the first rows y, errors in the array are avoided which might require further passes of head 210 over the same region of the substrate to correct. Further, since dispensers of a same series in each group are loaded with the same fluid, re-loading of the head system is not required to compensate for dispenser errors.

Figure 5A:
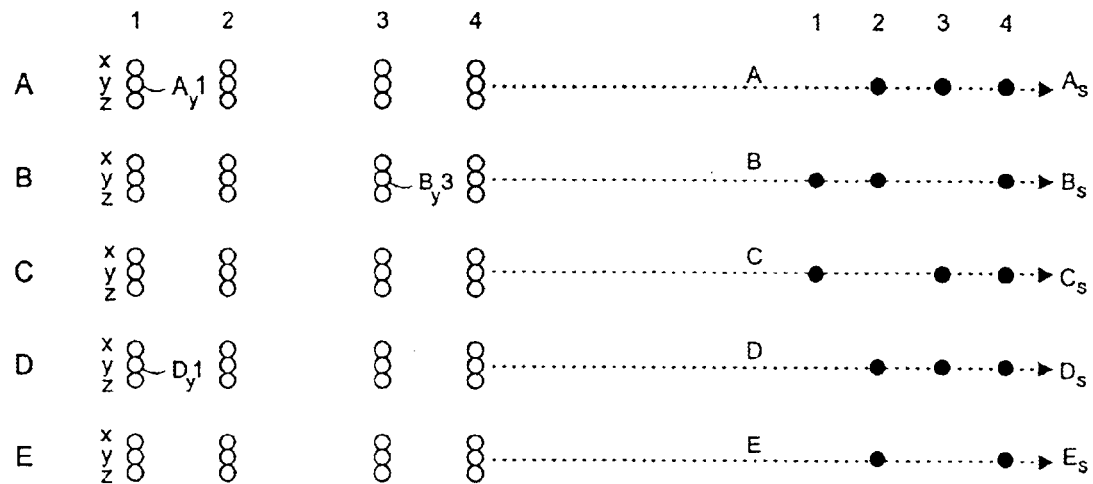
FIG. 5 schematically illustrates another embodiment of a method of the present invention.
Figure 5B:
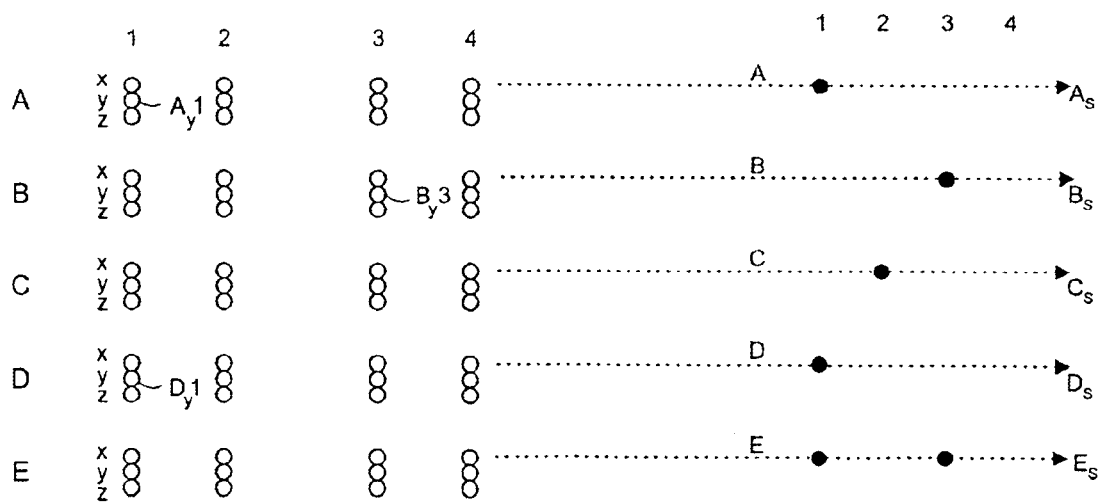

The method illustrated in FIG. 4 represents the simple case where there are no error dispensers in all of the second rows $A_x$, $B_x$, $C_x$, $D_x$, and $E_x$. However, in practice when it is desired to use a head system with a much larger number of rows, it is less likely that all dispensers in corresponding row will not have any errors. Operation of a method of the present invention in such a situation is illustrated in FIG. 5 using the same head system in FIG. 4. For simplicity, no deposition repetitions are illustrated in FIG. 5. In FIG. 5 the following dispensers in the first rows y have been identified as being in error: $A_y1$, $B_y3$, $C_y2$, $D_y1$, $E_y1$, and $E_y1$. Additionally, in FIG. 5 at least one or more dispensers in at least one or more of the second rows y has been found to additionally be in error so that it is not possible to use the method described in connection with FIG. 4. In this situation, as illustrated in FIG. 5, the first row y and second row x of each group A, B, C, D, E are alternately moved along the selected path for that group while droplets are dispensed from non-error dispensers of the first and second rows of each group in different parts of the pattern for the selected path for the respective groups. In particular, in FIG. 5A the first rows $A_y$, $B_y$, $C_y$, $D_y$, $E_y$ are aligned with the selected paths $A_s$ through $E_s$ and moved along those paths with respect to the substrate while dispensing drops from non-error dispensers in the first rows of the groups in accordance with a part of the pattern for those groups, as illustrated in FIG. 5A. Head system 210 can then be re-positioned such that the second rows $A_x$, $B_x$, $C_x$, $D_x$, $E_x$ are aligned with selected paths $A_s$ through $E_s$. The second rows $A_x$, $B_x$, $C_x$, $D_x$, $E_x$, are then moved along selected paths $A_s$ through $E_s$ with respect to the substrate while dispensing drops from non-error dispensers in the second rows of the groups in accordance with a part of the pattern for those groups, as illustrated in FIG. 5B.

While in FIG. 5 only first and second rows of the groups are used to complete the pattern for those groups, it will be appreciated that this concept can be extended to use other additional rows where error dispensers are identified such that the first and second rows cannot complete the pattern for all groups.

Note that in the methods of FIGS. 4 and 5, the columns of deposited droplets 14 are spaced closer together than the columns 14 of respective dispensers (the dispensed drop columns are "compressed" relative to the respective dispensers). This decrease in deposited drop spacing in a direction of travel of the head system, is readily obtained with pulse jet dispensers by processor 140 correctly timing dispenser actuation as head system 210 moves over the substrate. Such compression allows for arrays with deposited drop spacing as measured in the direction of head travel, to be independent of the spacing of the respective dispensers which deposited them.

Figure 6:
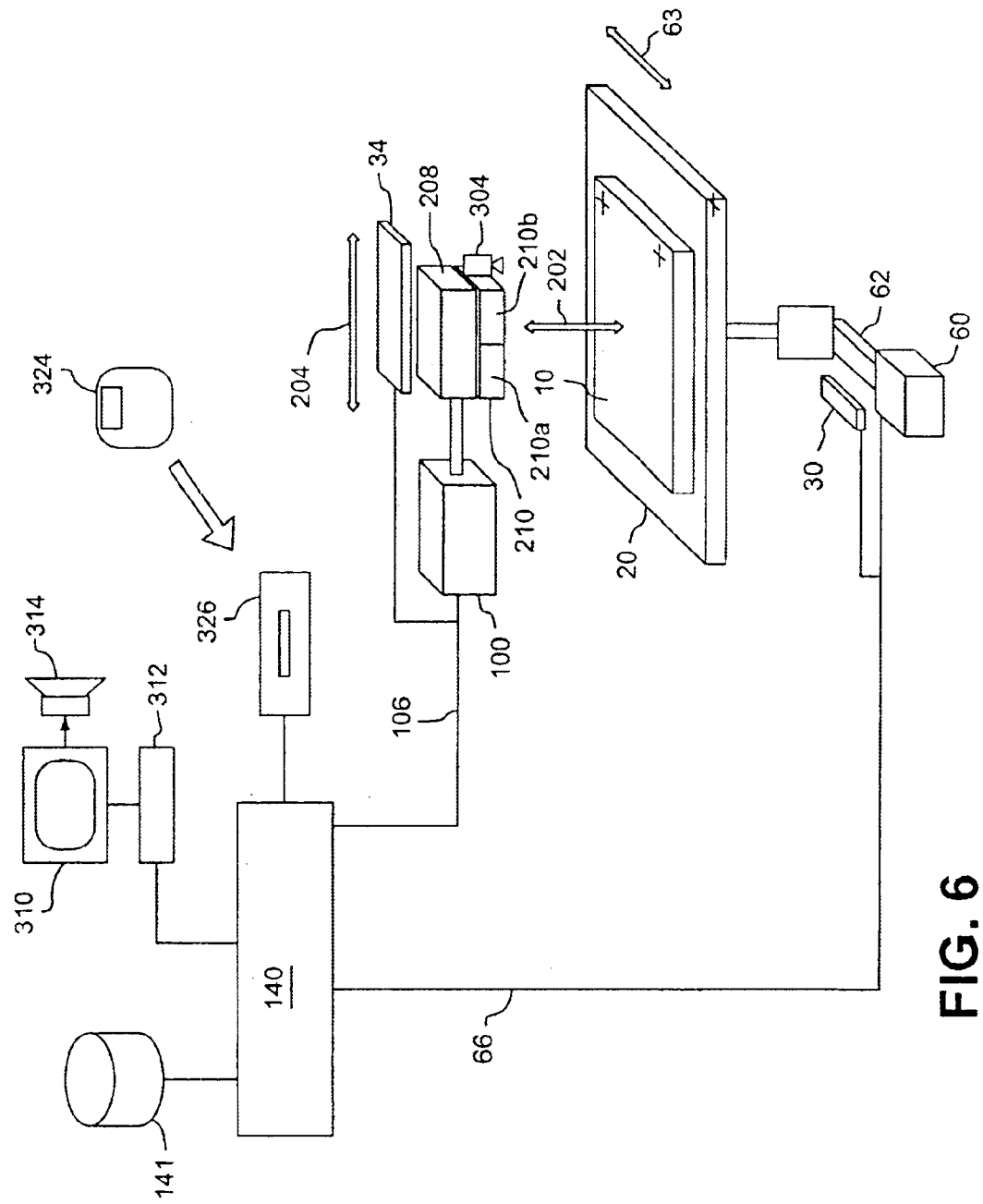
FIG. 6 is a schematic diagram of an apparatus at a user site which can execute a method of the present invention.

Referring to FIG. 6 an apparatus of the present invention includes a substrate station 20 on which can be mounted a substrate 10. Pins or similar means (not shown) can be provided on substrate station 20 by which to approximately align substrate 10 to a nominal position thereon. Substrate station 20 can include a vacuum chuck connected to a suitable vacuum source (not shown) to retain a substrate 10 without exerting too much pressure thereon, since substrate 10 is often made of glass.

A dispensing head system 210 is retained by a head retainer 208. Head system 210 can be positioned at any position facing substrate 10 by means of a transport system. The transport system includes a carriage 62 connected to a first transporter 60 controlled by processor 140 through line 66, and a second transporter 100 controlled by processor 140 through line 106. Transporter 60 and carriage 62 are used execute one axis positioning of station 20 (and hence mounted substrate 10) facing the dispensing head system 210, by moving it in the direction of nominal axis 63, while transporter 100 is used to provide adjustment of the position of head retainer 208 in a direction of nominal axis 204 (and hence move the rows of dispensers as described in connection with FIGS. 4 and 5). In this manner, head system 210 can be scanned line by line, by scanning along a line over substrate 10 in the direction of axis 204 using transporter 100, while line by line movement of substrate 10 in a direction of axis 63 is provided by transporter 60. Head system 210 may also optionally be moved in a vertical direction 202, by another suitable transporter (not shown). However, it will be appreciated that other scanning configurations could be used. However, it will be appreciated that both transporters 60 and 100, or either one of them, with suitable construction, could be used to perform the foregoing scanning of head system 210 with respect to substrate 10. Thus, when the present application refers to "positioning" one element (such as head system 210) in relation to another element (such as one of the stations 20 or substrate 10) it will be understood that any required moving can be accomplished by moving either element or a combination of both of them. An encoder 30 communicates with processor 140 to provide data on the exact location of substrate station 20 (and hence substrate 10 if positioned correctly on substrate station 20), while encoder 34 provides data on the exact location of holder 208 (and hence head system 210 if positioned correctly on holder 208). Any suitable encoder, such as an optical encoder, may be used which provides data on linear position. Angular positioning of substrate station 20 is provided by a transporter 120, which can rotate substrate station 20 about axis 202 under control of processor 140. Typically, substrate station 20 (and hence a mounted substrate) is rotated by transporter 120 under control of processor 140 in response to an observed angular position of substrate 10 as determined by processor 140 through viewing one or more fiducial marks on substrate 10 (particularly fiducial marks 18) with a camera (not shown). This rotation will continue until substrate 10 has reached a predetermined angular relationship with respect to dispensing head system 210. In the case of a square or rectangular substrate, the mounted substrate 10 will typically be rotated to align one edge (length or width) with the scan direction of head system 210 along axis 204.

Head system 210 may contain one or more (for example, two) heads mounted on the same head retainer 208. Each such head may be of a type commonly used in an ink jet type of printer and may, for example, have one hundred fifty drop dispensing orifices in each of two parallel rows, six chambers for holding polynucleotide solution communicating with the three hundred orifices, and three hundred ejectors which are positioned in the chambers opposite a corresponding orifice. Each ejector is in the form of an electrical resistor operating as a heating element under control of processor 140 (although piezoelectric elements could be used instead). Each orifice with its associated ejector and portion of the chamber, defines a corresponding pulse jet with the orifice acting as a nozzle. Thus, there are three hundred pulse jets in this configuration, although it will be appreciated that head system 210 could, for example, have more or less pulse jets as desired (for example, at least ten or at least one hundred pulse jets). In this manner, application of a single electric pulse to an ejector causes a droplet to be dispensed from a corresponding orifice. In the foregoing configuration, typically about twenty orifices in each group of six reservoirs (many of the orifices are unused and are plugged with glue), will be dispensing the same fluid. Thus, each "series" in such a configuration has twenty dispensers. Certain elements of each head can be adapted from parts of a commercially available thermal inkjet print head device available from Hewlett-Packard Co. as part no. HP51645A. The foregoing head system 210 and other suitable dispensing head designs are described in more detail in U.S. patent application entitled "A MULTIPLE RESERVOIR INK JET DEVICE FOR THE FABRICATION OF BIOMOLECULAR ARRAYS" Ser. No. 09/150,507 filed Sep. 9, 1998. However, other head system configurations can be used.

As is well known in the ink jet print art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

The sizes of the features can have widths (that is, diameter, for a round spot) in the range from a minimum of about 10 $\mu$m to a maximum of about 1.0 cm. In embodiments where very small spot sizes or feature sizes are desired, material can be deposited according to the invention in small spots whose width is in the range about 1.0 $\mu$m to 1.0 mm, usually about 5.0 $\mu$m to 500 $\mu$m, and more usually about 10 $\mu$m to 200 $\mu$m. Spot sizes can be adjusted as desired, by using one or a desired number of pulses from a pulse jet to provide the desired final spot size.

The apparatus further includes a sensor in the form of a camera 304, to monitor dispensers for errors (such as failure to dispense droplets) by monitoring for drops dispensed onto substrate 10 when required of a dispenser. Camera 304 communicates with processor 140, and should have a resolution that provides a pixel size of about 1 to 100 micrometers and more typically about 4 to 20 micrometers or even 1 to 5 micrometers. Any suitable analog or digital image capture device (including a line by line scanner) can be used for such camera, although if an analog camera is used processor 140 should include a suitable analog/digital converter. A detailed arrangement and use of such a camera to monitor for dispenser errors, is described in U.S. patent application Ser. No. 09/419,447 entitled "Biopolymer Array Inspection" by William D. Fisher. Particular observations techniques are described, for example, in co-pending U.S. patent application Ser. No. 09/302,898 filed Apr. 30, 1999 by Caren et al., assigned to the same assignee as the present application, incorporated herein by reference. Alternatively, the sensor can be a drop detector which detects an electrical charge an a dispensed drop, in accordance with the apparatus and methods described in U.S. Ser. No. 09/558,532 entitled "Array Fabrication with Drop Detection" filed by Christopher A. Schantz et al. Monitoring can occur during formation of an array and the information used during fabrication of the remainder of that array or another array, or test-print patterns can be run before array fabrication. A display 310, speaker 314, and operator input device 312, are further provided. Operator input device 312 may, for example, be a keyboard, mouse, or the like. Processor 140 has access to a memory 141, and controls print head system 210 (specifically, the activation of the ejectors therein), operation of the transport system, operation of each jet in print head system 210, capture and evaluation of images from the camera 304, and operation display 310 and speaker 314. Memory 141 may be any suitable device in which processor 140 can store and retrieve data, such as magnetic, optical, or solid state storage devices (including magnetic or optical disks or tape or RAM, or any other suitable device, either fixed or portable). Processor 140 may include a general purpose digital microprocessor suitably programmed from a computer readable medium carrying necessary program code, to execute all of the functions required of it as described below. It will be appreciated though, that when a "processor" such as processor 140 is referenced throughout this application, that such includes any hardware and/or software combination which will perform the required functions. Suitable programming can be provided remotely to processor 140, or previously saved in a computer program product such as memory 141 or some other portable or fixed computer readable storage medium using any of those devices mentioned below in connection with memory 141. For example, a magnetic or optical disk 324 may carry the programming, and can be read by disk reader 326.

Operation of the apparatus of FIG. 6 in accordance with a method of the present invention, will now be described. First, it will be assumed that memory 141 holds a target drive pattern. This target drive pattern is the instructions for driving the apparatus components as required to form the target array (which includes target locations and dimension for each spot) on substrate 10 and includes, for example, movement commands to transporters 60 and 100 as well as firing commands for each of the pulse jets in head system 210 co-ordinated with the movement of head system 210 and substrate 10, as well as instructions for which polynucleotide solution (or precursor) is to be loaded in each pulse jet (that is, the "loading pattern"). This target drive pattern is based upon the target array pattern and can have either been input from an appropriate source (such as input device 312, a portable magnetic or optical medium, or from a remote server, any of which communicate with processor 140), or may have been determined by processor 140 based upon an input target array pattern (using any of the appropriate sources previously mentioned) and the previously known nominal operating parameters of the apparatus. Further, it will be assumed that drops of different biomonomer or biopolymer containing fluids (or other fluids) have been placed at respective regions of a loading station (not shown). Operation of the following sequences are controlled by processor 140, following initial operator activation, unless a contrary indication appears.

For any given substrate 10, the operation is basically follows: (i) determine a target drive pattern (if not already provided) to obtain target array pattern, based on nominal operating parameters and target polynucleotide array pattern; (ii) evaluate data from the sensor for errors in the operation of the dispensers (for example, dispenser does not dispense a drop upon command) (iii) if there is no error in one or more operating parameters then the apparatus is operated according to the target drive pattern; (iv) if there is an error in one or more dispensers then processor 140 derives, based on the error, a corrected drive pattern from the target pattern such that firing by error dispensers is replaced by firing from non-error dispensers in accordance with the methods already described above. Note that a corrected drive pattern can either be determined initially prior to dispensing droplets to fabricate the array, or may be determined (and continually corrected) during formation of an array as different dispenser errors are detected. The target drive pattern may be saved in memory or just derived during the actual array fabrication and sent as instructions directly to the apparatus components.

It will be appreciated that any discrepancy between a nominal dispenser parameter and an actual parameter, may optionally only be classified as an "error" if it meets or exceeds a predetermined threshold value. Particular examples of dispenser errors which may occur in the apparatus of FIG. 6 include any one or more of the following:

1. A dispenser does not fire upon command or dispenses a drop which is of unsatisfactory volume.
2. A dispenser dispenses a drop at a misplaced position (for example, due to the dispenser firing at an angle from the expected trajectory).

The apparatus is then operated as follows: (a) load head system 210 with a first 1 set of polynucleotide containing solutions or their precursors (for example, a given head may be able to hold n different members); (b) dispense droplets from head system 210 onto substrate 10 or a set of substrates in accordance with the target or corrected drive patterns to provide the target array pattern for the first set on each of multiple arrays 12; and (c) repeat the foregoing sequence starting at step (i) with a second set and subsequent sets of polynucleotide containing solutions or their precursors, until all required solutions have been dispensed onto substrate 10 (for example, if each array has m–n members, and presynthesized polynucleotides are being dispensed, then the sequence will be repeated m times). It will be appreciated though, that techniques of this application or the two applications (incorporated herein by reference) entitled "Array Fabrication" by Peter Webb filed the same date as the present application and both assigned to Agilent Technologies, Inc. Ser. Nos. 09/629,500 and 09/628,963 may be combined as appropriate.

A loading sequence for head system 210 is more completely described in co-pending patent applications "FABRICATING BIOPOLYMER ARRAYS", by Caren et al., Ser. No. 09/302,922, and "PREPARATION OF BIOPOLYMER ARRAYS" by A. Schleifer et al., Ser. No. 09/302,899, both filed Apr. 30, 1999 and both assigned to the same assignee as the present application, and the references cited therein, including the possibility of using a flexible microtitre plate as described in U.S. patent application "Method and Apparatus for Liquid Transfer", Ser. No. 09/183,604. Those references and all other references cited in the present application, are incorporated into this application by reference. Note that since the dispensers of each series communicates with the same corresponding reservoir for that series, the dispensers of a given series are effectively loaded with the same polynucleotide fluid. Processor 140 can control pressure within head system 210 to load each polynucleotide solution into the chambers in the head by drawing it through the orifices as described in one or more of the foregoing applications.

Substrate 10 is loaded onto substrate station 20 either manually by an operator, or optionally by a suitable automated driver (not shown) controlled, for example, by processor 140.

The deposition sequence is then initiated to deposit the desired arrays of polynucleotide containing fluid droplets on the substrate to provide drops on the substrate according to the target pattern each with respective feature locations and dimensions. As already mentioned, in this sequence processor 140 will operate the apparatus according to the target or corrected drive pattern, by causing the transport system to position head system 210 facing substrate station 20, and particularly the mounted substrate 10, and with head system 210 at an appropriate distance from substrate 10. Processor 140 then causes the transport system to scan head system 210 across substrate 10 line by line (or in some other desired pattern), while coordinating activation of the ejectors in head system 210 so as to dispense droplets as described above. If necessary or desired, processor 140 can repeat the load and 1=dispensing sequences one or more times until head system 210 has dispensed droplets in to obtain the target arrays 12 to be formed on substrate 10. The number of spots in any one array 12 can, for example, be at least ten, at least one hundred, at least one thousand, or even at least one hundred thousand.

At this point the droplet dispensing sequence is complete.

When a user receives an array made by an apparatus or method of the present invention, it will typically be exposed to a sample and the array interrogated following exposure. Interrogation is usually accomplished by a suitable scanner which can read the location and intensity of fluorescence at each feature of an array following exposure to a fluorescently labeled sample (such as a polynucleotide containing sample). For example, such a scanner may be similar to the GENEARRAY scanner available from Hewlett-Packard, Palo Alto, Calif. Results from the interrogation can be processed such as by rejecting a reading for a feature which is below a predetermined threshold and/or forming conclusions based on the pattern read from the array (such as whether or not a particular target sequence may have been present in the sample). The results of the interrogation or processing can be forwarded (such as by communication) to a remote location if desired, for further use.

The present methods and apparatus may be used to deposit biopolymers or other chemical moieties on surfaces of any of a variety of different substrates, including both flexible and rigid substrates. Preferred materials provide physical support for the deposited material and endure the conditions of the deposition process and of any subsequent treatment or handling or processing that may be encountered in the use of the particular array. The array substrate may take any of a variety of configurations ranging from simple to complex. Thus, the substrate could have generally planar form, as for example a slide or plate configuration, such as a rectangular or square or disc. In many embodiments, the substrate will be shaped generally as a rectangular solid, having a length in the range about 4 mm to 1 m, usually about 4 mm to 600 mm, more usually about 4 mm to 400 mm; a width in the range about 4 mm to 1 m, usually about 4 mm to 500 mm and more usually about 4 mm to 400 mm; and a thickness in the range about 0.01 mm to 5.0 mm, usually from about 0.1 mm to 2 mm and more usually from about 0.2 to 1 mm. However, larger substrates can be used, particularly when such are cut after fabrication into smaller size substrates carrying a smaller total number of arrays 12.

In the present invention, any of a variety of geometries of arrays on a substrate 10 may be fabricated other than the rectilinear rows and columns of arrays 12 of FIG. 1. For example, arrays 12 can be arranged in a sequence of curvilinear rows across the substrate surface (for example, a sequence of concentric circles or semi-circles of spots), and the like. Similarly, the pattern of features 16 may be varied from the rectilinear rows and columns of spots in FIG. 2 to include, for example, a sequence of curvilinear rows across the substrate surface (for example, a sequence of concentric circles or semi-circles of spots), and the like. In such cases, the arrangement of dispensers in head system 210 may be altered accordingly. The configuration of the arrays and their features may be selected according to manufacturing, handling, and use considerations.

The substrates may be fabricated from any of a variety of materials. In certain embodiments, such as for example where production of binding pair arrays for use in research and related applications is desired, the materials from which the substrate may be fabricated should ideally exhibit a low level of non-specific binding during hybridization events. In many situations, it will also be preferable to employ a material that is transparent to visible and/or UV light. For flexible substrates, materials of interest include: nylon, both modified and unmodified, nitrocellulose, polypropylene, and the like, where a nylon membrane, as well as derivatives thereof, may be particularly useful in this embodiment. For rigid substrates, specific materials of interest include: glass; plastics (for example, polytetrafluoroethylene, polypropylene, polystyrene, polycarbonate, and blends thereof, and the like); metals (for example, gold, platinum, and the like).

The substrate surface onto which the polynucleotide compositions or other moieties is deposited may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated).

Various further modifications to the particular embodiments described above are, of course, possible. Accordingly, the present invention is not limited to the particular embodiments described in detail above.

What is claimed is:

1. An apparatus for fabricating a chemical array, comprising:
   (a) a head system with multiple groups of drop dispensers which move in unison, wherein each group comprises a series of drop dispensers, and each series comprises at least a first and a second drop dispenser loaded with a same fluid;
   (b) a transport system to move the head system with respect to a substrate with different dispensers in the series of each group following respective paths; and
   (c) a processor which:
      dispenses droplets from a single dispenser of each group of dispensers in a pattern along a selected path for each group during operation of the transport system, so as to form the array; and when an error in said first drop dispenser of a series is detected, dispenses droplets from said second dispenser of the series along the selected path for its group.

2. An apparatus according to claim 1 wherein the dispensers are pulse jets.

3. An apparatus according to claim 1 wherein the processor, when the error indication is identified, dispenses droplets from each second dispenser of the series within each of multiple groups in at least part of the pattern for the selected path of the group containing that series.

4. An apparatus according to claim 3 wherein:
   a column of dispensers within a group communicate with a corresponding common reservoir for the column.

5. An apparatus according to claim 3 wherein, when the error indication is identified, the processor dispenses droplets from the second dispenser of a series in a complete pattern for the first dispenser of the same series.

6. An apparatus according to claim 3 wherein, when the error indication is identified, the processor dispenses droplets from at least one second dispenser of the first group in a complete pattern for the selected path of the first group.

7. A method according to claim 3 wherein when another error indication is identified by the processor additionally indicating an error in the second dispenser of a second group, the processor alternately moves the first and second dispensers of each group along the selected path for that group while dispensing droplets from non-error dispensers of the first and second groups in different parts of the pattern for the selected path for the first group.

8. A computer program product for use with an apparatus for fabricating a chemical array having:
   a head system with multiple groups of drop dispensers which move in unison, wherein each group comprises a series of drop dispensers, and wherein said series comprises at least a first and a second drop dispenser loaded with a same fluid;
   a transport system to move the head system with respect to a substrate with different dispensers of the series of each group following respective paths; and
   a processor;
   the computer program product comprising a computer readable storage medium having a computer program stored thereon which, when loaded into the processor, performs the steps of:
   a) dispensing droplets from a single dispenser of each group of dispensers in a pattern along a selected path for each group during operation of the transport system
   b) identifying for an error in one or more dispensers of a group; and
   c) moving said group of dispensers to dispense droplets from said second drop dispenser of said group along at least part of the path selected for said group.

9. A computer program product according to claim 8 wherein in step (b) droplets are dispensed from each second dispenser of the series within each of multiple groups in at least part of the pattern for the selected path of the group containing that series.

10. A computer program product according to claim 8 wherein when a dispenser of a second set of the first group is additionally identified as being in error, the program causes the first and second dispensers of each group to be alternately moved along the selected path for that group while droplets are dispensed from non-error dispensers of the first and second groups in different parts of the pattern for the selected path for the first group.

11. An apparatus for fabricating a chemical array, comprising:
   (a) a head system with multiple groups of drop dispensers which move in unison, wherein each group comprises multiple rows and columns of dispensers and wherein at least two dispensers of a same column within a group are loaded with a same fluid;
   (b) a transport system to move the head system with respect to a substrate with different rows following respective paths; and
   (c) a processor which:
      dispenses droplets from dispensers during operation of the transport system, in a pattern along a selected path for each group so as to form the array; and
      in response to detection of an error in dispensers of different columns within first and second rows of a first group:
      (i) positions the head with a first row of each group aligned with the selected path for that group;
      (ii) moves the head with respect to the substrate while dispensing droplets from said second dispenser in the first row of the first group in accordance with a part of the pattern for the selected path for that group;
      (iii) re-positions the head such that a second row of each group is aligned with the selected paths; and
      (iv) moves the head with respect to the substrate while dispensing droplets from non-error dispensers in the second row of the first group in accordance with a part of the pattern for that group.

12. An apparatus according to claim 11 wherein the dispensers are pulse jets.

13. An apparatus according to claim 11 wherein in step (iv) droplets are dispensed from non-error dispensers in the second row of each of multiple groups in accordance with at least part of the pattern for each group.

14. An apparatus according to claim 11 wherein:
   said dispensers of a same column within a group are loaded with a same fluid by communicating with a corresponding common reservoir, and in step (iv) droplets are dispensed from a non-error dispenser that is in the same column as the error dispenser.

15. An apparatus according to claim 11 wherein in step (iv) droplets are dispensed from at least one second row of a group in the complete pattern for the selected path of the same group.

16. An apparatus according to claim 11 additionally comprising a sensor to monitor dispensers for an error and provide corresponding data to the processor.

17. A method of fabricating a chemical array using:
   a head system with multiple groups of drop dispensers which move in unison, wherein each group comprises a series of drop dispensers, and wherein said series comprises at least a first and a second drop dispenser loaded with a same fluid;

a transport system to move the head system with respect to a substrate with different dispensers in the series of each group following respective paths;

a processor to dispense droplets from a single dispenser of each group in a pattern along a selected path for each group during operation of the transport system, so as to form the array;

the method comprising:

a) identifying an error in said first drop dispenser of a group; and b) moving said group of dispensers to dispense droplets from said second drop dispenser of said group along at least part of the path selected for said group.

18. A method according to claim 17 wherein in step (b) droplets are dispensed from each second dispenser of the series within each of multiple groups in at least part of the pattern for the selected path of the group containing that series.

19. A method according to claim 18 wherein:

a series of dispensers within a group communicate with a corresponding common reservoir for that series.

20. A method according to claim 18 wherein in step (b) the droplets are dispensed from a second dispenser of a series in a complete pattern for the first dispenser of the series containing the second dispenser.

21. A method according to claim 18 wherein in step (b) the droplets are dispensed from at least one second dispenser of a first group, in a complete pattern for the selected path of the first group.

22. A method according to claim 18 wherein when a second dispenser of a second group is additionally in error, the first and second dispensers of each group are alternately moved along the selected path for that group while droplets are dispensed from non-error dispensers of the first and second groups in at least part of the pattern for the selected paths for the first and second groups.

23. A method according to claim 17 wherein the dispensers are pulse jets.

24. A method according to claim 17 wherein the array comprises biopolymer features.

25. A method according to claim 24 wherein the array comprises peptide containing features.

26. A method according to claim 17 wherein the array carries polynucleotide containing features.

27. A method according to claim 17 wherein the array carries features with polynucleotides of different sequence.

28. A method of fabricating a chemical array using:

a head system with multiple groups of drop dispensers which move in unison, wherein each group comprises multiple rows and columns of dispensers and wherein at least two dispensers of a same column within a group are loaded with a same fluid;

a transport system to move the head system with respect to a substrate with different rows following respective paths;

a processor to dispense droplets from dispensers during operation of the transport system, in a pattern along a selected path for each group, so as to form the array;

the method comprising:

a) identifying an error in one or more dispensers; and b) when in response to identifying an error in one or more dispensers of different columns within first and second rows of a first group:

(i) positioning the head with a first row of each group aligned with the selected path for that group;

(ii) moving the head with respect to the substrate while dispensing droplets from non-error dispensers in the first row of the first group in accordance with a part of the pattern for the selected path for that group;

(iii) re-positioning the head such that a second row of each group is aligned with the selected paths; and (iv) moving the head with respect to the substrate while dispensing droplets from non-error dispensers in the second row of the first group in accordance with a part of the pattern for that group.

29. A method according to claim 28 wherein the dispensers are pulse jets.

30. A method according to claim 28 wherein in step (b)(iv) droplets are dispensed from non-error dispensers in the second row of each of multiple groups in accordance with at least part of the pattern for each group.

31. A method according to claim 28 wherein:

said dispensers of a same column within a group are loaded with a same fluid by communicating with a corresponding common reservoir; and in step (b)(iv) droplets are dispensed from a non-error dispenser in the same column and group as the error dispenser.

32. A method according to claim 28 wherein in step (b)(iv) droplets are dispensed from at least one second row of a group in the complete pattern for the selected path of the group containing that second row.

* * * * *

UNITED STATES PATENT AND TRADEMARK OFFICE
CERTIFICATE OF CORRECTION

PATENT NO. : 6,890,760 B1  Page 1 of 1
DATED : May 10, 2005
INVENTOR(S) : Webb

It is certified that error appears in the above-identified patent and that said Letters Patent is hereby corrected as shown below:

Column 16,
Line 55, delete "reservoir," and insert -- reservoir; --.

Column 18,
Line 16, after "b)" delete "when".
Line 37, delete "each" and insert -- that --.

Signed and Sealed this

Fourth Day of April, 2006

JON W. DUDAS
*Director of the United States Patent and Trademark Office*